(No Model.)
J. BANIGAN.
RUBBER BOOT.
No. 298,546. Patented May 13, 1884.
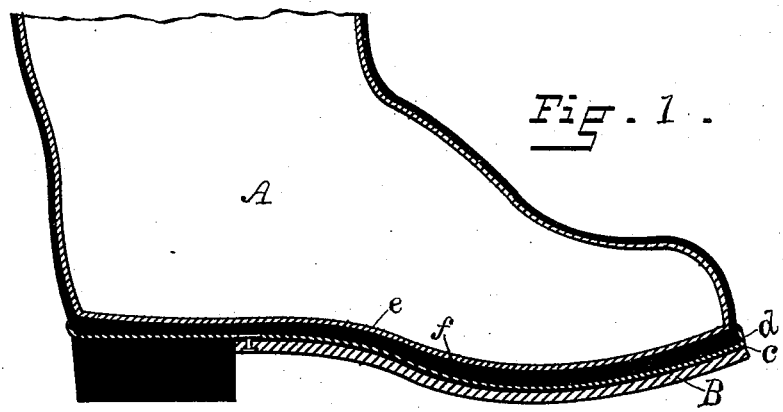
Fig. 1.
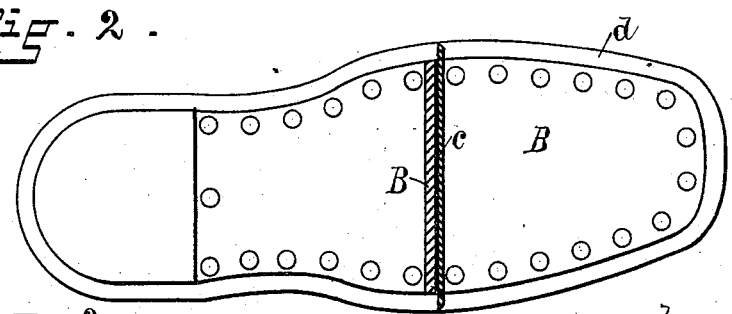
Fig. 2.
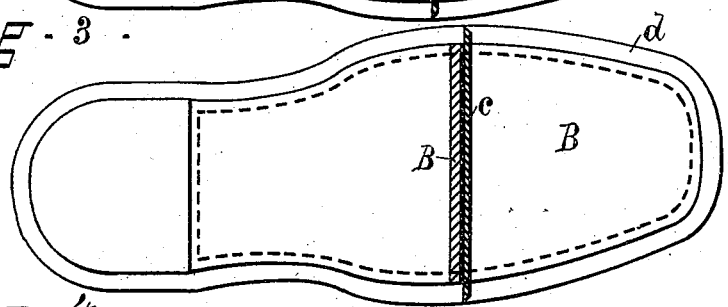
Fig. 3.
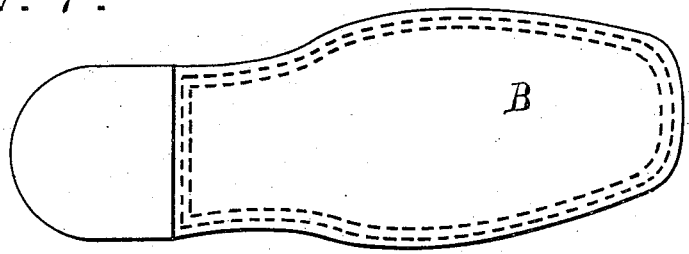
Fig. 4.
Fig. 5.
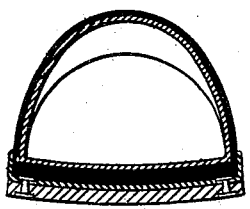
WITNESSES:
C. H. Luther Jr
Fred E. Field
INVENTOR:
Joseph Banigan
by Joseph A. Miller & Co
Attys

UNITED STATES PATENT OFFICE.

JOSEPH BANIGAN, OF PROVIDENCE, RHODE ISLAND.

RUBBER BOOT.

SPECIFICATION forming part of Letters Patent No. 298,546, dated May 13, 1884.

Application filed January 17, 1884. (No model.)

*To all whom it may concern:*

Be it known that I, JOSEPH BANIGAN, of the city and county of Providence, State of Rhode Island, have invented a new and useful Improvement in Rubber Boots; and I hereby declare the following to be a full, clear, and exact description of the same, reference being had to the accompanying drawings, forming part of this specification.

Rubber boots are frequently used by miners, quarrymen, and others in places covered with sharp-edged or pointed stones, quartz, and other material which readily cuts and injures the usual rubber soles, and to protect rubber boots used in such places a leather sole is often secured to the usual rubber sole by nailing. Such nailing does not firmly secure the leather sole, as the clinching of the nails on the inside against the rubber sole gives only a yielding insufficient hold on the rubber. Such boots are liable to leak where the nails have penetrated the sole, and the strain of the leather sole when it is bent in walking soon tears the clinched nails through the rubber.

The object of this invention is to produce a rubber boot with an additional leather sole secured to the rubber sole in the process of manufacture and before the vulcanization of the boot, and thus produce a new and improved article of manufacture.

Figure 1 is a sectional view of a rubber boot provided with a leather sole. Fig. 2 is a view of a leather sole secured to a rubber sole by rivets. Fig. 3 is a view of a leather sole secured to a rubber sole by sewing. Fig. 4 is a view of a leather sole secured to a sheet of rubber and a piece of canvas by sewing. Fig. 5 is a cross-section of a rubber boot, showing the prepared leather sole secured to the rubber boot.

In the drawings, A is the rubber boot. B is the leather sole. *c* is a sheet of rubber cemented to the leather sole. *d* is a piece of canvas impregnated with rubber cement. *e* is the insole, and *f* the filling-sole.

Several methods may be adapted for securing the leather sole to the boot. To enable others skilled in the art to carry out this invention, I will now fully describe some of the methods.

When a leather sole or a leather tap-sole is to be secured to the usual rubber sole, I cut out the leather sole and cement to its inner surface a thin sheet of rubber. On this I cement a piece of canvas. The sheet of rubber and the canvas may be first cemented together in the usual manner, and the two then secured by cementation to the inner surface of the leather sole. I now secure the leather sole, the sheet-rubber, and the canvas together by sewing, by riveting, or by any other of the well-known means by which soles are secured to boots and shoes. The so-prepared leather sole or leather tap, as the case may be, is now secured by rubber cement to the sole of the rubber boot by the boot-maker in the process of manufacturing the rubber boot, and the whole boot with the leather sole is subjected to the usual process of vulcanization, by which a perfect and reliable union is formed between the rubber of the sole, the canvas, and the sheet of rubber between the canvas and the leather sole; and as the latter is secured by mechanical means to the canvas and sheet of rubber, it cannot separate. Another method consists in preparing the leather sole, in the same manner as above described, by cementing a sheet of rubber and a piece of canvas to the leather sole and securing the whole together by mechanical means. The so-prepared leather sole I now secure to the smooth sole, leaving the rand projecting around the leather sole and the heel. This smooth sole, so provided with the leather sole, is supplied to the boot-maker and by him secured to the rubber boot, the whole being afterward subjected to the usual process of vulcanization. A third method consists in securing to the leather sole a sheet of rubber and a piece of canvas, as before, then cementing the same to the rubber sole, and sewing, riveting, or otherwise securing the whole together by mechanical means before the sole is secured to the rubber boot, and before the process of vulcanization. In this latter method the piece of canvas may be placed on the inner surface of the rubber sole. The canvas secures a firm hold for the thread, the rivets, or other mechanical means by which the leather sole is secured. As the canvas is impregnated with rubber and the sheet of rubber between the canvas and leather sole in the process of vulcanization fuses with the rubber of the main rubber sole, the whole becomes firmly united into one homogeneous mass, producing a new article of manufacture in all respects superior to any rubber boots heretofore produced.

If desired, a shoe may be provided with a leather sole in the same manner as a boot.

Having thus described my invention, I claim as new and desire to secure by Letters Patent—

1. A rubber boot or shoe provided with a leather sole secured by sewing, riveting, or otherwise to a sheet of rubber and a piece of canvas, and secured to the boot or shoe by cementation, as described.

2. A leather sole or tap provided on one side with a sheet of rubber and a piece of canvas, secured together by sewing or otherwise, adapted to be secured to a rubber boot by cementation, as described.

3. A leather sole provided on one side with a sheet of rubber and a piece of canvas adapted to be secured to the sole of a rubber boot by cementation and mechanical means, as described.

4. The combination, with a rubber boot or shoe, of a leather sole provided on one side with rubber and canvas impregnated with rubber secured together by sewing, or other mechanical means, and by vulcanization, as described.

5. The improved method for securing leather soles to rubber boots, the same consisting in cementing to the leather sole a sheet of canvas with intervening rubber, securing the sole to the canvas by means of sewing, riveting, or other mechanical means, and cementing the whole together before vulcanization, as described.

JOSEPH BANIGAN.

Witnesses:
J. A. MILLER,
M. F. BLIGH.